US012694384B2

(12) United States Patent
Hinkle

(10) Patent No.: US 12,694,384 B2
(45) Date of Patent: Jul. 28, 2026

(54) REUSABLE BAG RECOGNITION

(71) Applicant: TOSHIBA GLOBAL COMMERCE SOLUTIONS, INC., Durham, NC (US)

(72) Inventor: Johanna E. Hinkle, South Bend, IN (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 272 days.

(21) Appl. No.: 18/653,790

(22) Filed: May 2, 2024

(65) Prior Publication Data

US 2025/0342454 A1      Nov. 6, 2025

(51) Int. Cl.
| | |
|---|---|
| *G06Q 20/20* | (2012.01) |
| *G06V 10/44* | (2022.01) |
| *G06V 10/56* | (2022.01) |
| *G06V 20/52* | (2022.01) |

(52) U.S. Cl.
CPC ............. *G06Q 20/20* (2013.01); *G06V 10/44* (2022.01); *G06V 10/56* (2022.01); *G06V 20/52* (2022.01)

(58) Field of Classification Search
CPC ........ G06Q 20/20; G06Q 20/18; G06V 10/44; G06V 10/56; G06V 20/52; G06V 10/764; G06V 10/82; G06N 3/045; G06N 3/08; G06N 3/09; G06N 20/00; G07G 1/0036; G07G 1/0063
See application file for complete search history.

(56) References Cited

U.S. PATENT DOCUMENTS

| | | | |
|---|---|---|---|
| 11,270,546 B1* | 3/2022 | Mosman ................ | B65D 83/08 |
| 2020/0234266 A1* | 7/2020 | Sugimoto ............ | G06Q 20/209 |
| 2021/0042797 A1 | 2/2021 | Shamiss et al. | |
| 2021/0125171 A1* | 4/2021 | Perrucci ................ | A45C 15/00 |
| 2025/0111404 A1* | 4/2025 | Ikezawa .............. | G06Q 20/322 |

FOREIGN PATENT DOCUMENTS

| | | | | | |
|---|---|---|---|---|---|
| CN | 109559186 A | * | 4/2019 | ........ | G06Q 30/0641 |
| CN | 112488318 A | * | 3/2021 | .............. | G07G 1/00 |
| CN | 113053044 A | * | 6/2021 | ............ | G06F 18/22 |
| JP | 2020177313 A | * | 10/2020 | | |
| JP | 2020194234 A | * | 12/2020 | | |
| JP | 2021047632 A | * | 3/2021 | | |
| JP | 2022142701 A | * | 9/2022 | | |

* cited by examiner

*Primary Examiner* — Emily C Terrell
*Assistant Examiner* — Julia Z. Yao
(74) *Attorney, Agent, or Firm* — Patterson + Sheridan, LLP; Gero G. McClellan

(57) ABSTRACT

Described herein is a system that uses artificial intelligence to classify bags at a checkout station. The system includes a camera that captures an image of a bag during a transaction at a checkout station, a memory, and a processor communicatively coupled to the memory. The processor analyzes, using a machine learning model, the image of the bag to determine a characteristic of the bag; determines, using the machine learning model and based on the characteristic of the bag, that the bag is new; and adds the bag to the transaction in response to determining that the bag is new.

20 Claims, 7 Drawing Sheets

108

400

REUSABLE BAG RECOGNITION

BACKGROUND

The present disclosure relates to reusable bag recognition techniques. Generally, customers use reusable bags to hold items during a transaction. Reusable bags, however, may also be items that are part of the transaction. For example, a customer may purchase a reusable bag from a store during a transaction at the store. It may be difficult to correctly discern whether a reusable bag is a new reusable bag that should be added to the transaction or a used bag that should not be added to the transaction.

DETAILED DESCRIPTION

Figure 1A:
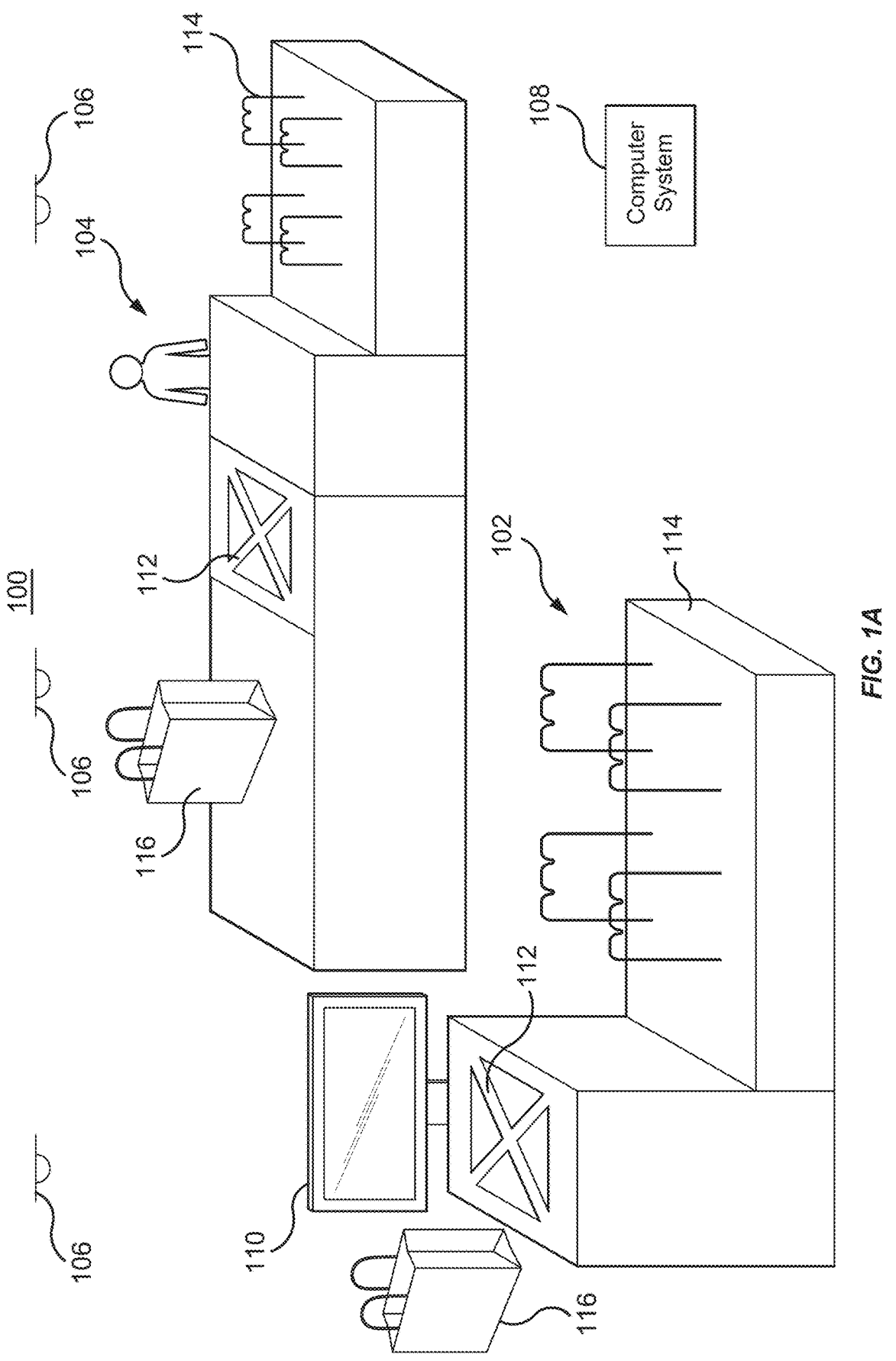
FIGS. 1A and 1B illustrate an example system.

The present disclosure describes a system that uses artificial intelligence to classify bags at a checkout station. A camera may capture an image of a reusable bag. The system then uses a machine learning model (e.g., a neural network) to analyze the image of the bag to determine characteristics of the bag. The machine learning model then classifies the bag as new or used based on these characteristics. For example, the machine learning model may determine that the bag is used if the bag has frayed edges, a crumpled shape, and/or is discolored. As another example, the machine learning model may determine that the bag is new if the bag has crisp edges, a smooth or uncrumpled shape, and/or sharp colors. The system may add the bag to a transaction if the bag is classified as new.

Technical Advantages

In certain embodiments, the system provides several technical advantages. For example, the system may provide accurate classifications of whether reusable bags at a checkout station are new or used. As another example, the system may reduce the number or amount of reusable bags that are lost from inventory.

FIG. 1 illustrates an example system 100. Generally, the system 100 may be a checkout system. As seen in FIG. 1, the system 100 includes a self-checkout system 102, an assisted checkout system 104, one or more cameras 106, and a computer system 108. Generally, the computer system 108 uses artificial intelligence to analyze images of bags (e.g., reusable bags) from the cameras 106 to determine whether the bags are new or used. If the bags are new, the computer system 108 adds the bags to transactions for payment. If the bags are used, the computer system 108 refrains from adding the bags to the transactions. In this manner, the computer system 108 reduces the number or amount of bags that are misclassified and lost from inventory.

Users may bring items to the self-checkout system 102 to scan and purchase the items. Users may also bring items to the assisted checkout system 104, where a clerk or associate scans items for the users. The checkout systems 102 and 104 may include a display 110, a scanner 112, and/or a bagging area 114. Generally, the scanner 112 scans items, and the display 110 presents information about the scanned items and the transaction. The scanned items may be placed in the bagging area 114 for temporary storage or holding.

The cameras 106 are positioned in the system 100 such that the cameras 106 may capture images or video of the checkout systems 102 and 104. For example, the cameras 106 may be positioned on the ceiling or on the checkout systems 102 and 104. The cameras 106 may be directed such that the cameras 106 capture images or video of the items being brought to the checkout systems 102 and 104.

In the example of FIG. 1A, bags 116 are brought to the checkout systems 102 and 104. The bags 116 may be reusable bags that users intend to use to hold other scanned items. In certain instances, the bags 116 are new, and the users may be purchasing the bags 116 at the checkout systems 102 and 104. In existing self-checkout systems, the users are responsible for identifying the bags 116 as new by scanning the bags 116 (e.g., scanning tags or barcodes on the bags 116) so that the bags 116 are added to the transactions. In existing assisted checkout systems, the clerk or associate is responsible for determining whether the bags 116 are new and for scanning the bags 116 so that the bags 116 are added to the transactions. This process, however, results in incorrect determinations of whether bags are used or new. For example, a user may intentionally or unknowingly fail to scan a new bag 116 at the self-checkout system, or the clerk or associate may accidentally determine a bag 116 is used when the bag 116 is actually new. In these situations, a new bag that should have been added to a transaction is instead lost.

The computer system 108 uses artificial intelligence to assist in distinguishing bags 116 that are new from bags 116 that are used. For example, the computer system 108 may apply a machine learning model (e.g., a neural network) that is trained to analyze images or video of bags 116 to determine characteristics of the bags 116. These characteristics may include whether the bags 116 have frayed edges, whether the bags 116 are wrinkled or crumpled, whether the bags 116 have discolorations, etc. The machine learning model may then predict whether the bags 116 are new or used based on these characteristics. For example, the machine learning model may predict that a bag 116 is new if the bag 116 has unfrayed edges and is not wrinkled. The computer system 108 may then add the bag 116 to a transaction if the computer system 108 determines that the bag is new. If the computer system 108 determines that the bag 116 is used, the computer system 108 may refrain from adding the bag 116 to the transaction. In this manner, the computer system 108 reduces the number or amount of bags 116 that are misclassified and lost from inventory.

Figure 1B:
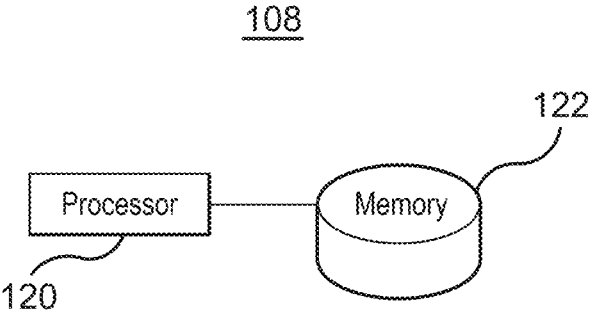

FIG. 1B illustrates an example computer system 108 in the system 100 of FIG. 1A. The computer system 108 may be integrated with or separate from the checkout systems 102 and 104. The computer system 108 may be in communication with the checkout systems 102 and 104. As seen in FIG. 1B, the computer system 108 includes a processor 120 and a memory 122 that perform the functions or features of the computer system 108 described herein.

The processor 120 is any electronic circuitry, including, but not limited to one or a combination of microprocessors, microcontrollers, application specific integrated circuits (ASIC), application specific instruction set processor (ASIP), and/or state machines, that communicatively couples to the memory 122 and controls the operation of the computer system 108. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on the memory 122 to perform any of the functions described herein. The processor 120 controls the operation and administration of the computer system 108 by processing information (e.g., information received from the checkout system 102 or 104 and memory 122). The processor 120 is not limited to a single processing device and may encompass multiple processing devices contained in the same device or computer or distributed across multiple devices or computers. The processor 120 is considered to perform a set of functions or actions if the multiple processing devices collectively perform the set of functions or actions, even if different processing devices perform different functions or actions in the set.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In some embodiments, the software may include an application executable by the processor 120 to perform one or more of the functions described herein. The memory 122 is not limited to a single memory and may encompass multiple memories contained in the same device or computer or distributed across multiple devices or computers. The memory 122 is considered to store a set of data, operational software, or information if the multiple memories collectively store the set of data, operational software, or information, even if different memories store different portions of the data, operational software, or information in the set.

Figure 2:
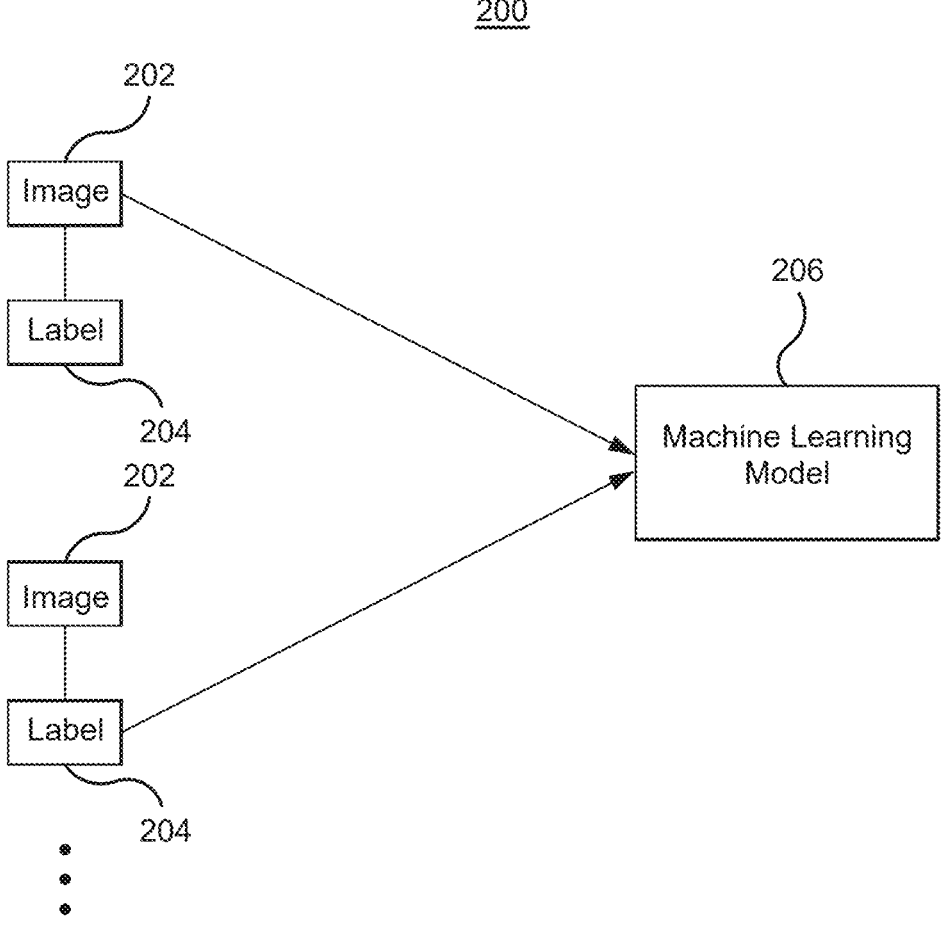
FIG. 2 illustrates an example operation for training a machine learning model.

FIG. 2 illustrates an example operation 200 for training a machine learning model. In some embodiments, a computer system (e.g., the computer system 108 or a different computer system) performs the operation 200. By performing the operation 200, the computer system trains a machine learning model to predict when a bag 116 is new or used based on images or videos of the bag 116.

The computer system begins by receiving images 202 of different bags 116. The images 202 may include frames of videos of the bags 116. The images 202 may show the bags 116 from different perspectives or angles. The images 202 may have been captured by cameras 106 in stores. The images 202 may be accompanied by labels 204. Each label 204 may indicate whether the bag 116 shown in the image 202 corresponding to the label 204 is new or used. As a result, the label 204 indicates whether a bag in an image 202 is a new bag or a used bag.

The computer system trains a machine learning model 206 using the images 202. The machine learning model 206 may analyze the images 202 to determine the characteristics (e.g., features and/or appearance) of the bags 116 that appear in the images 202. The machine learning model 206 then predicts whether the bags 116 in the images 202 are new or used. The machine learning model 206 may compare these predictions with the labels 204 for the images 202. The comparison may reveal to the machine learning model 206 whether the predictions were correct or incorrect. Based on these comparisons, the machine learning model 206 may learn which characteristics of the bags 116 in the images 202 indicate whether the bags 116 are used or new. The machine learning model 206 may then assign weights to these characteristics. The weights may indicate how much a certain characteristic indicates that a bag is new or used (e.g., a higher weight may indicate that a characteristic more heavily influences whether a bag is new or used). After the machine learning model 206 has been trained on a sufficient number of images 202 and labels 204, the machine learning model 206 may be considered trained and may be deployed or implemented to predict whether images show new or used bags.

Figure 3:
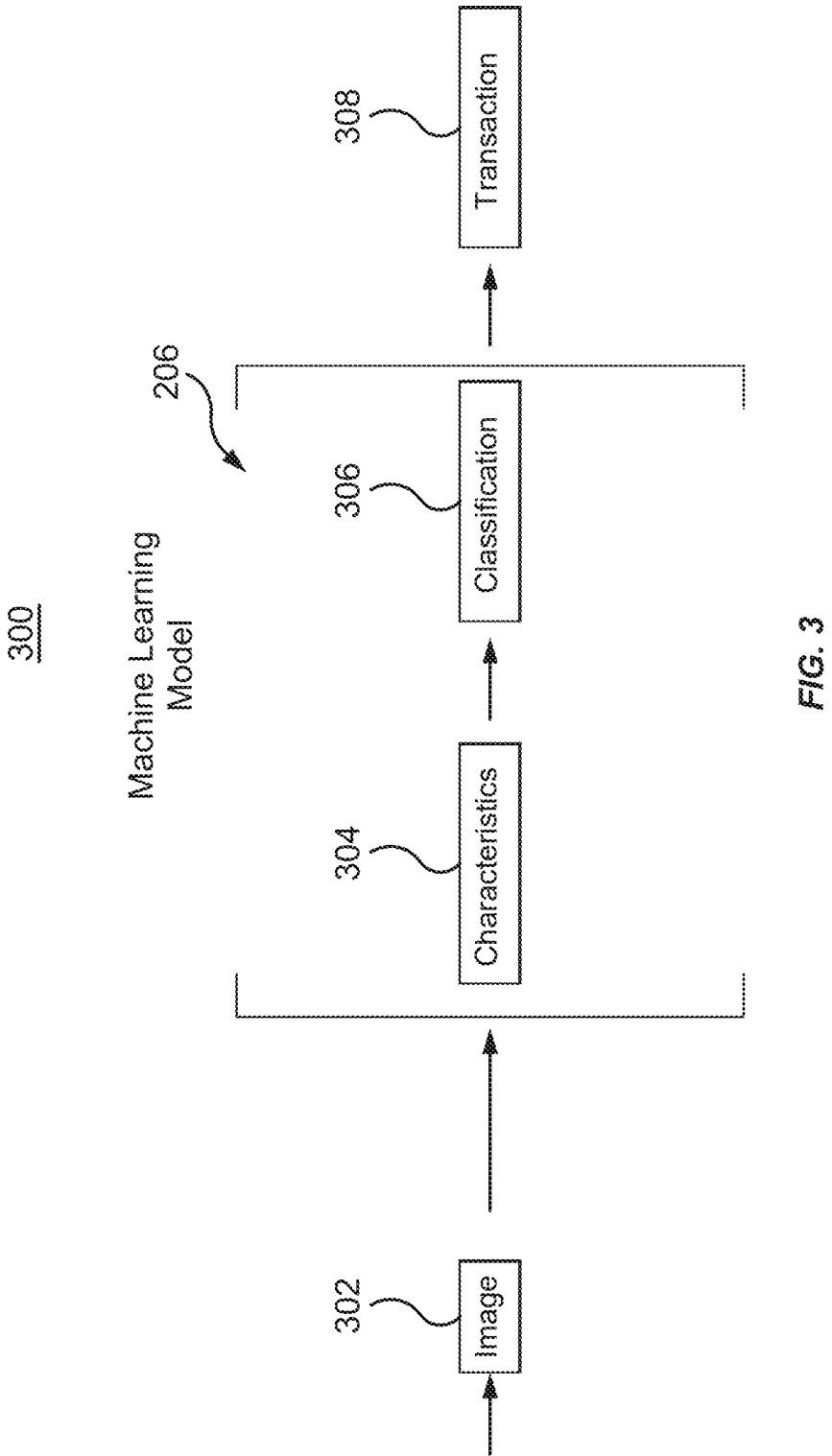
FIG. 3 illustrates an example operation for classifying a bag performed by the system of FIG. 1A.

FIG. 3 illustrates an example operation 300 for classifying a bag 116 performed by the system 100 of FIG. 1. In certain embodiments, the computer system 108 performs the operation 300. By performing the operation 300, the computer system 108 applies the machine learning model 206 to predict whether bags 116 are new or used.

The computer system 108 begins by receiving an image 302 from a camera 106. The computer system 108 may receive multiple images 302 from multiple cameras 106. Additionally or alternatively, the computer system 108 may receive multiple images 302 that are frames of a video from the camera 106 or multiple cameras 106. The image 302 may show a bag 116 at a checkout system 102 or 104. The camera 106 may have captured the image 302 of the bag 116 when a user brought the bag 116 to the checkout system 102 or 104. The computer system 108 may receive multiple images 302 of the bag 116 from multiple cameras 106. The images 302 may show different perspectives of the bag 116.

The computer system 108 analyzes the image 302 using the machine learning model 206. The machine learning model 206 may analyze the image 302 to detect the bag 116 in the image 302. The machine learning model 206 may also analyze the bag 116 in the image 302 to determine characteristics 304 (e.g., features and/or appearance) of the bag 116. The characteristics 304 may indicate any physical features of the bag 116 that are visible in the image 302. For example, the characteristics 304 may indicate a quality of the edges of the bag 116, the quality of the surfaces of the bag 116, a color of the bag 116, whether a tag is present on the bag 116, etc.

The machine learning model 206 then determines a classification 306 for the bag 116 in the image 302 based on the determined characteristics 304. In some embodiments, the machine learning model 206 determines whether the bag 116 in the image 302 is new or used. Thus, the classification 306 may be a prediction generated by the machine learning model 206 as to whether the bag 116 is a new bag or a used bag.

The computer system 108 then determines whether the bag 116 in the image 302 should be added to a transaction 308 at the checkout system 102 or 104. If the classification 306 indicates that the bag 116 is new, then the computer system 108 may add the bag 116 to the transaction 308. The user who brought the bag 116 to the checkout system 102 or 104, may then be expected to pay for the bag 116 as part of the transaction 308. If the computer system 108 determines that the bag 116 is used, then the computer system 108 may refrain from adding the bag 116 to the transaction 308. As a result, the user who brought the bag 116 to the checkout system 102 or 104 may not be expected to pay for the bag 116 as part of the transaction 308.

Figure 4:
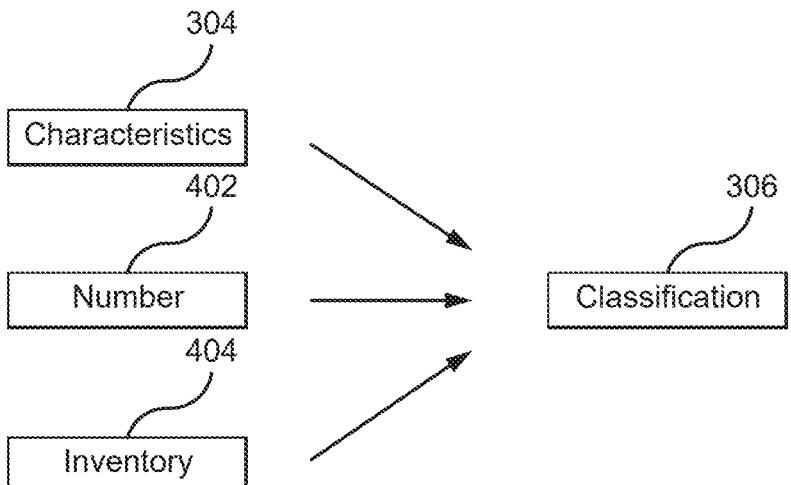
FIG. 4 illustrates an example operation for classifying a bag performed by the system of FIG. 1A.

FIG. 4 illustrates an example operation 400 for classifying a bag 116 performed by the system 100 of FIG. 1. In certain embodiments, the computer system 108 performs the operation 400. By performing the operation 400, the computer system 108 determines the classification 306 based on other factors.

The computer system 108 determines the characteristics 304 of the bag 116 in the image 302 by analyzing the image 302 using the machine learning model 206. As discussed previously, the characteristics 304 may indicate the physical features of the bag 116 that are visible in the image 302. For example, the computer system 108 may determine whether the bag 116 has frayed edges or sharp, crisp edges. As another example, the computer system 108 may determine whether the bag has a crumpled shape or a smooth shape. As another example, the computer system 108 may determine whether the bag 116 is discolored. As yet another example, the computer system 108 may determine whether a label or tag is attached to the bag 116.

The computer system 108 may also determine a number 402 of the bags 116 that are present at the checkout system 102 or 104. For example, the image 302 or the images 302 may show different sections of the checkout systems 102 or 104. The computer system 108 may apply the machine learning model 206 to the image 302 or the images 302 to determine a number 402 of the bags 116 that are present at the checkout system 102 or 104. The number 402 may indicate the number of bags 116 at the checkout system 102 or 104 that are the same as the bag 116 in the image 302. For example, the computer system 108 may detect the bags 116 in the image 302 or images 302 and determine whether these bags 116 share similar characteristics 304 (e.g., size, shape, color, appearance, etc.). The computer system 108 may determine that the bags 116 that share similar characteristics as the bag 116 are the same as the bag 116, increasing the number 402.

The machine learning model 206 may determine the classification 306 based on the number 402. For example, if the number 402 is large, indicating that there are a large number of bags 116 at the checkout system 102 or 104 that are the same as the bag 116 in the image 302, then the machine learning model 206 may be more likely to determine that the bag 116 in the image 302 is a new bag. On the other hand, if the number 402 is small, then the machine learning model 206 may be less likely to determine that the bag 116 in the image 302 is new.

The computer system 108 may also determine an inventory 404 for the bag 116. The computer system 108 may determine the characteristics 304 of the bag 116 and determine (e.g., from an inventory database) a bag in inventory that shares similar characteristics 304. The database may indicate the types of bags in inventory and the characteristics of those types of bags (e.g., size, shape, color, appearance, etc.). If the computer system 108 determines a bag in inventory that shares similar characteristics 304 as the bag 116, the computer system 108 may determine that that bag matches the bag 116. The inventory 404 may indicate a number of the matching bag in inventory. For example, in a store where the checkout system 102 or 104 is present, the machine learning model 206 may analyze the inventory 404 of the matching bag to determine the classification 306. For example, if the inventory 404 indicates that there are several of the matching bags present in the inventory 404 of the store, then the machine learning model 206 may be more likely to determine that the bag 116 in the image 302 is new. On the other hand, if the inventory 404 indicates that there are few or no matching bags present in the inventory 404 of the store, then the machine learning model 206 may be less likely to determine that the bag 116 is new.

As an example operation, the machine learning model 206 may analyze the image 302 to determine the characteristics 304 of the bag 116 in the image 302. The characteristics may include that the bag 116 has frayed edges and a crumpled shape. In response, the machine learning model 206 may predict that the bag 116 is a used bag. As another example, the machine learning model 206 may analyze the image 302 to determine that the bag 116 has crisp edges and smooth surfaces. In response, the machine learning model 206 may predict that the bag 116 is a new bag. As another example, the machine learning model 206 may analyze the image 302 to determine that the bag 116 has discolorations and that a label or tag is attached to the bag 116. In response, the machine learning model 206 may predict that the bag 116 is a used bag. As another example, the machine learning model 206 may analyze the image 302 to determine that the bag 116 has a crumpled shape and a label or tag attached to the bag. In response, the machine learning model 206 may determine that, despite the crumpled surface, the bag 116 is new.

In each of these examples, the machine learning model 206 may apply a weight to each of the determined characteristics of the bag 116 (e.g., frayed or crisp edges, crumped or smooth surfaces, discolorations, tag or label, etc.). The machine learning model 206 may then compute a value (e.g., a sum, product, average, etc.) of the weighted characteristics and compare the value to a threshold. If the value meets the threshold, then the machine learning model 206 may determine that the bag 116 is new. If the value does not meet the threshold, then the machine learning model 206 may determine that the bag 116 is used, and vice versa.

Figure 5:
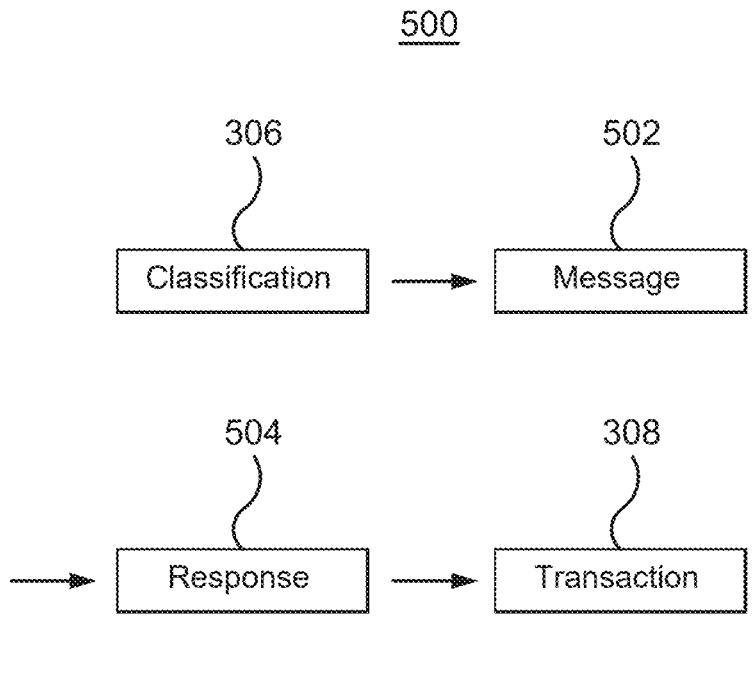
FIG. 5 illustrates an example operation for classifying a bag performed by the system of FIG. 1A.

FIG. 5 illustrates an example operation 500 for classifying a bag 116 performed by the system 100 of FIG. 1A. In certain embodiments, the computer system 108 performs the operation 500. By performing the operation 500, the computer system 108 responds to the classification 306 for the bag 116.

The computer system 108 begins by generating the classification 306 for the bag 116. The computer system 108 may have applied the machine learning model 206 to the image 302 of the bag 116 to determine the classification 306. The classification 306 may indicate whether the bag 116 is new or used. The computer system 108 may then perform certain actions or features depending on whether the classification 306 of the bag 116 is new or used.

For example, if the classification 306 indicates that the bag 116 is new, then the computer system 108 may generate a message 502. The computer system 108 may present the message 502 on the display 110 to alert the user that the bag 116 is new and is being added to the transaction 308. In some embodiments, the message 502 includes a prompt or a question to seek confirmation from the user. For example, the prompt or question may ask the user to confirm whether the bag 116 is new or used. The computer system 108 may present the prompt or question on the display 110 so that the user may view the prompt or question.

The user may provide a response 504 to the prompt or question. The computer system 108 receives the response 504 from the user. For example, the user may interact with the display 110 or another peripheral input device (e.g., touchpad, keypad, buttons, etc.) to provide the response 504. The response 504 may indicate whether the user confirms that the bag 116 is new or used. The computer system 108 may add the bag 116 to the transaction 308 if the response 504 confirms that the bag 116 is new. If the response 504 indicates that the bag 116 is used, then the computer system 108 may refrain from adding the bag 116 to the transaction 308.

If the classification 306 indicates that the bag 116 is used, the computer system 108 may refrain from presenting the message 502. Alternatively, the computer system 108 may present a message 502 indicating that the detected bag 116 is used and will not be added to the transaction 308. The message 502 may include a prompt requesting the user to confirm whether the bag 116 is used in a response 504. If the response 504 confirms that the bag 116 is used, then the computer system 108 may refrain from adding the bag 116 to the transaction 308. If the response 504 indicates that bag 116 is new, then the computer system 108 may add the bag 116 to the transaction 308.

Figure 6:
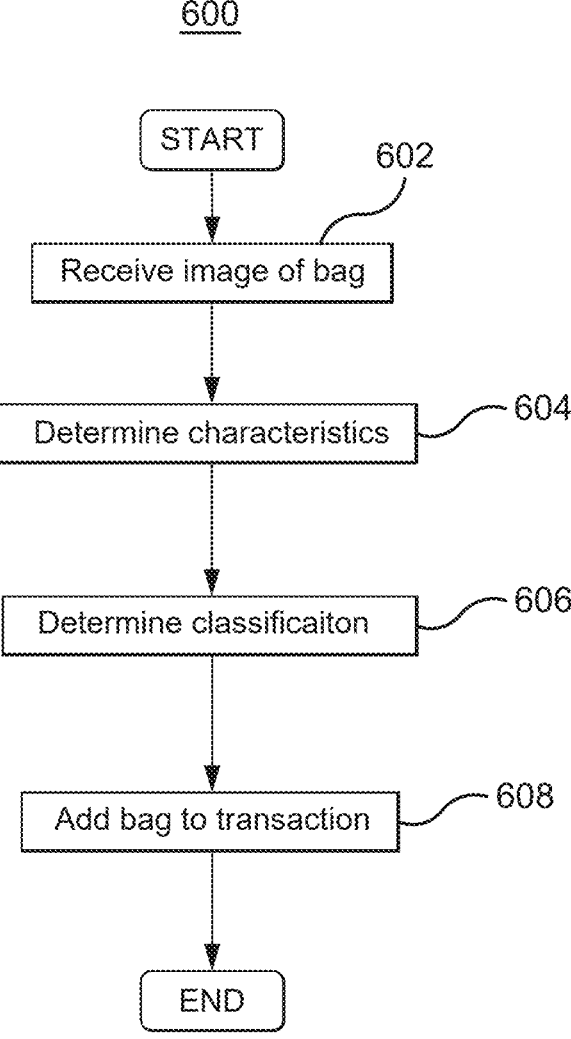
FIG. 6 is a flowchart of an example method performed in the system of FIG. 1A.

FIG. 6 is a flowchart of an example method 600 performed by the system 100 of FIG. 1A. In some embodiments, the computer system 108 performs the method 600. By performing the method 600, the computer system 108 predicts whether a bag 116 at the checkout system 102 or 104 is a new or used bag.

In block 602, the computer system 108 receives an image 302 of a bag 116. The image 302 may have been captured by a camera 106 at the checkout system 102 or 104 where the bag 116 was presented. The computer system 108 may receive multiple images 302 of the bag 116. These images 302 may show different perspectives or angles of the bag 116. In some instances, the images 302 may be frames of a video of the bag 116 captured by the camera 106.

In block 604, the computer system 108 determines characteristics 304 of the bag 116 in the image 302. The computer system 108 may use the machine learning model 206 to analyze the image 302. The machine learning model 206 may analyze the image 302 to determine the characteristics 304 of the bag 116 in the image 302. The characteristics 304 may include any physical features of the bag 116 that are visible in the image 302. For example, the characteristics 304 may indicate whether the bag 116 has frayed edges, has crumpled surfaces, is discolored, or has a tag or label attached.

In block 606, the computer system 108 determines a classification 306 for the bag 116. The computer system 108 applies the machine learning model 206 to the characteristics 304. The machine learning model 206 then predicts or determines the classification 306. The classification 306 may indicate whether the bag 116 is new or used. For example, if the bag 116 has frayed edges, a crumpled surface, is discolored, and/or has no tag or label attached, then the machine learning model 206 is more likely to classify the bag 116 as used. On the other hand, if the bag 116 has crisp edges, has smooth surfaces, is not discolored, and/or has a tag or label attached, then the machine learning model 206 is more likely to classify the bag 116 as a new bag. In the example of FIG. 6, the computer system 108 classifies the bag 116 as a new bag.

In block 608, the computer system 108 adds the bag 116 to the transaction 308. The computer system 108 may add the bag 116 to the transaction 308 because the computer system 108 has determined that the bag 116 is a new bag. By adding the bag 116 to the transaction 308, the computer system 108 may request payment for the bag 116, which prevents the bag 116 from being lost from inventory.

In summary, the computer system 108 uses artificial intelligence to classify bags 116 at a checkout system 102 or 104. A camera 106 may capture an image 302 of a reusable bag 116. The computer system 108 then uses a machine learning model 206 (e.g., a neural network) to analyze the image 302 of the bag 116 to determine characteristics 304 of the bag 116. The machine learning model 206 then classifies the bag 116 as new or used based on these characteristics 304. For example, the machine learning model 206 may determine that the bag 116 is used if the bag 116 has frayed edges, a crumpled shape, and/or is discolored. As another example, the machine learning model 206 may determine that the bag 116 is new if the bag 116 has crisp edges, a smooth or uncrumpled shape, and/or sharp colors. The computer system 108 may add the bag 116 to a transaction 308 if the bag 116 is classified as new.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, microcode, etc.) or an embodiment combining software and hardware aspects that may generally be referred to herein as a "circuit," "module" or "system."

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to one or more embodiments, other and further embodiments may be devised without departing from the basic scope thereof, and the scope thereof is determined by the claims that follow.

What is claimed is:

1. A system comprising:
a camera arranged to capture an image of a bag during a transaction at a checkout station;
a memory; and
a processor communicatively coupled to the memory, the processor configured to:
analyze, using a machine learning model, the image of the bag to determine a characteristic of the bag;

determine, using the machine learning model and based on the characteristic of the bag, that the bag is new; and add the bag to the transaction in response to determining that the bag is new.

2. The system of claim 1, wherein the characteristic comprises whether the bag has a frayed edge.

3. The system of claim 1, wherein the characteristic comprises whether the bag is discolored.

4. The system of claim 1, wherein the characteristic comprises whether a label is attached to the bag.

5. The system of claim 1, wherein the characteristic comprises a shape of the bag.

6. The system of claim 1, wherein the processor is further configured to determine a number of bags in the transaction that are the same as the bag, and wherein determining that the bag is new is further based on the number of bags.

7. The system of claim 1, wherein determining that the bag is new is further based on an inventory of bags.

8. The system of claim 1, wherein the processor is further configured to present a message based on determining that the bag is new.

9. A method comprising:

capturing, by a camera, an image of a bag during a transaction at a checkout station;

analyzing, by a processor and using a machine learning model, the image of the bag to determine a characteristic of the bag;

determining, by the processor, using the machine learning model, and based on the characteristic of the bag, that the bag is new; and adding the bag to the transaction in response to determining that the bag is new.

10. The method of claim 9, wherein the characteristic comprises whether the bag has a frayed edge.

11. The method of claim 9, wherein the characteristic comprises whether the bag is discolored.

12. The method of claim 9, wherein the characteristic comprises whether a label is attached to the bag.

13. The method of claim 9, wherein the characteristic comprises a shape of the bag.

14. The method of claim 9, further comprising determining a number of bags in the transaction that are the same as the bag, and wherein determining that the bag is new is further based on the number of bags.

15. The method of claim 9, wherein determining that the bag is new is further based on an inventory of bags.

16. The method of claim 9, further comprising presenting a message based on determining that the bag is new.

17. A non-transitory computer readable medium storing instructions that, when executed by a processor, cause the processor to:

receive an image of a bag captured by a camera during a transaction at a checkout station;

analyze, using a machine learning model, the image of the bag to determine a characteristic of the bag;

determine, using the machine learning model and based on the characteristic of the bag, that the bag is new; and add the bag to the transaction in response to determining that the bag is new.

18. The medium of claim 17, wherein the characteristic comprises whether the bag has a frayed edge.

19. The medium of claim 17, wherein the characteristic comprises whether the bag is discolored.

20. The medium of claim 17, wherein the characteristic comprises whether a label is attached to the bag.

* * * * *